(12) United States Patent
Chiba

(10) Patent No.: US 12,488,086 B2
(45) Date of Patent: Dec. 2, 2025

(54) IMAGE PROCESSING APPARATUS AND CONTROL METHOD FOR IMAGE PROCESSING APPARATUS

(71) Applicant: SHARP KABUSHIKI KAISHA, Sakai (JP)

(72) Inventor: Kunihisa Chiba, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 220 days.

(21) Appl. No.: 18/215,103

(22) Filed: Jun. 27, 2023

(65) Prior Publication Data

US 2024/0012902 A1    Jan. 11, 2024

(30) Foreign Application Priority Data

Jul. 7, 2022   (JP) ................................ 2022-109930

(51) Int. Cl.
G06F 21/46    (2013.01)

(52) U.S. Cl.
CPC ...... *G06F 21/46* (2013.01); *G06F 2221/2141* (2013.01)

(58) Field of Classification Search
CPC .. G06F 21/46; G06F 2221/2141; G06F 21/31; H04N 1/00854; H04N 1/4406; H04N 1/4413
See application file for complete search history.

(56) References Cited

U.S. PATENT DOCUMENTS

| | | | | |
|---|---|---|---|---|
| 6,070,244 A * | 5/2000 | Orchier | .................. | H04L 63/20 709/224 |
| 8,332,918 B2 * | 12/2012 | Vedula | ..................... | G06F 21/46 713/182 |
| 8,949,932 B2 * | 2/2015 | Henderson | .............. | H04L 63/20 726/1 |
| 10,027,713 B2 * | 7/2018 | Shimizu | .................. | H04L 63/20 |
| 2005/0235341 A1 * | 10/2005 | Stieglitz | ................ | H04L 63/083 726/5 |
| 2010/0005107 A1 * | 1/2010 | DiFalco | .................. | H04L 43/50 709/221 |
| 2010/0325249 A1 * | 12/2010 | Brunson | ............. | H04L 61/4547 709/221 |
| 2013/0041796 A1 * | 2/2013 | Eggert | ............... | G06Q 10/0635 705/317 |
| 2013/0117738 A1 * | 5/2013 | Livingston | ................ | G06F 8/65 717/168 |
| 2014/0310033 A1 * | 10/2014 | Cauvy | .................... | G06Q 10/02 705/5 |
| 2015/0067800 A1 | 3/2015 | Hosoda | | |

(Continued)

FOREIGN PATENT DOCUMENTS

JP    2015-049755 A    3/2015

*Primary Examiner* — James R Turchen
(74) *Attorney, Agent, or Firm* — ScienBiziP, P.C.

(57) ABSTRACT

An image processing apparatus includes: a storage that stores authentication information; and a controller that controls access by a user on the basis of the authentication information. In the case where an authentication requirement is changed, the controller identifies the authentication information that no longer satisfies the authentication requirement, and displays a ratio of pieces of the authentication information that no longer satisfy the authentication requirement to all pieces of the authentication information stored in the storage.

12 Claims, 20 Drawing Sheets

(56) References Cited

U.S. PATENT DOCUMENTS

| | | | |
|---|---|---|---|
| 2021/0006677 A1* | 1/2021 | Ushinohama | H04N 1/00474 |
| 2021/0035116 A1* | 2/2021 | Berrington | G06N 5/04 |
| 2022/0206729 A1* | 6/2022 | Akimoto | G06F 3/1273 |

* cited by examiner

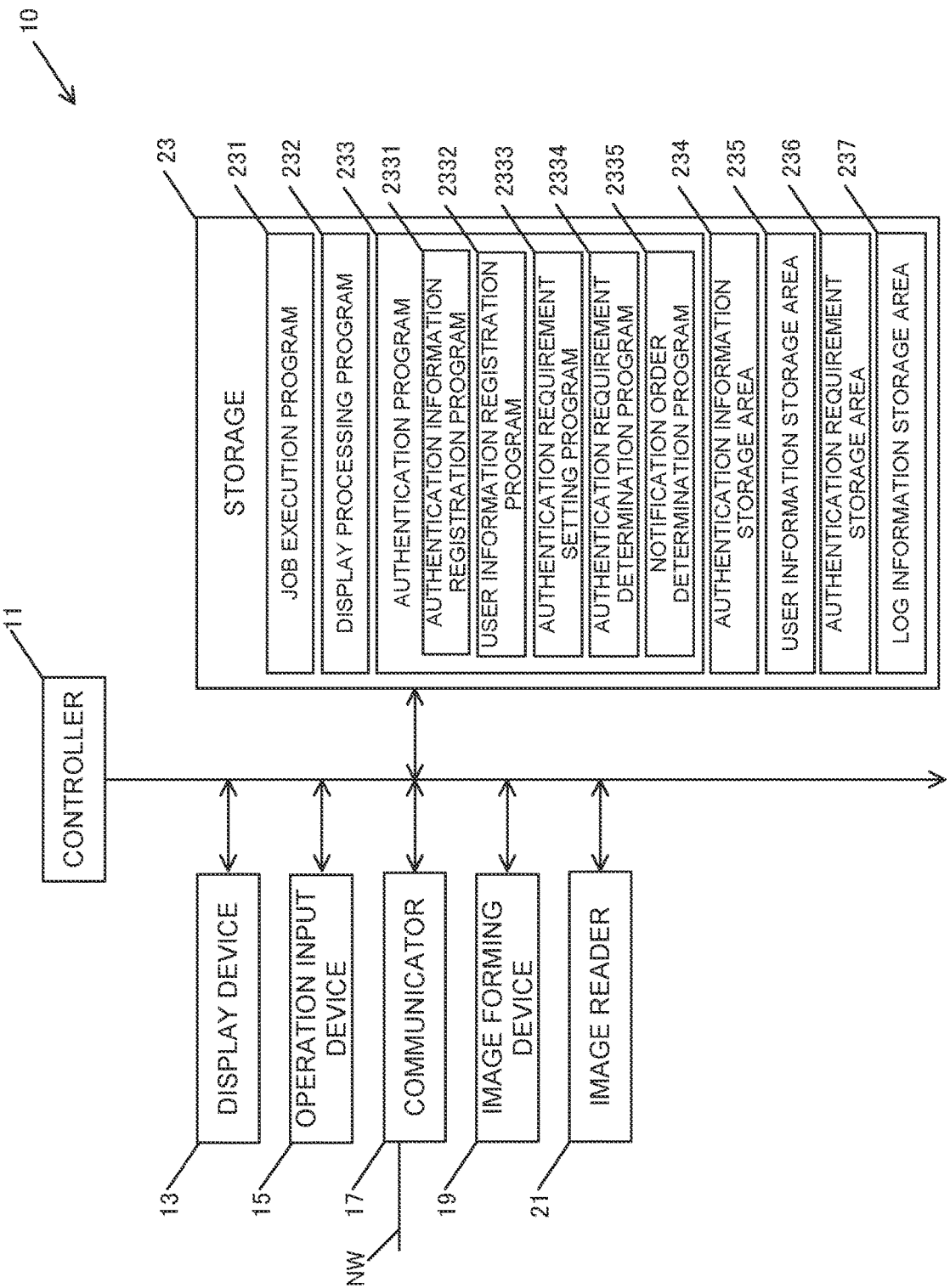

FIG. 3A

| ID | ACCOUNT NAME | PASSWORD | LAST PASSWORD UPDATE DATE AND TIME |
|---|---|---|---|
| #001 | SAABBCCDD | hellow1 | 2021/01/11 |
| #002 | SEEFFGGHH | Aa1 | 2020/09/15 |
| #003 | SIIJJKKLL | aaabbcccddd | 2022/02/02 |
| ... | ... | ... | ... |

FIG. 3B

| ID | USER NAME | EMAIL ADDRESS | GROUP AFFILIATION |
|---|---|---|---|
| #001 | AABBCCDD | ABCD@sample.com | GENERAL USER |
| #002 | EEFFGGHH | EFGH@sample.com | ADMINISTRATOR |
| #003 | IIJJKKLL | ... | GUEST USER |
| ... | ... | ... | ... |

FIG. 3C

| AUTHENTICATION REQUIREMENT | NUMBER OF CHARACTERS | UPPER CASE LETTER, LOWER CASE LETTER, NUMBER |
|---|---|---|
| 01 | 3 | No |
| 02 | 5 | Yes |

FIG. 4A

USER NAME: IIJJKKLL
USER NAME: AABBCCDD
USER NAME: EEFFGGHH

| JOB ID | EXECUTION DATE AND TIME | JOB TYPE | NUMBER OF COPIES |
|---|---|---|---|
| JB000335 | 2022/11/14 16:20 | COPY | 3 |
| JB000333 | 2022/11/14 14:50 | SCAN (Email) | 0 |
| JB000295 | 2022/11/14 11:00 | PRINT | 10 |
| JB000280 | 2022/11/14 9:30 | PRINT | 15 |

FIG. 4B

| ID | ACCOUNT NAME | NUMBER OF LOGINS | NUMBER OF FAILED LOGIN ATTEMPTS (COUNT/MONTH) |
|---|---|---|---|
| #001 | SAABBCCDD | 30 | 2 |
| #002 | SEEFFGGHH | 300 | 10 |
| #003 | SIIJJKKLL | 3 | 0 |
| ... | ... | ... | ... |

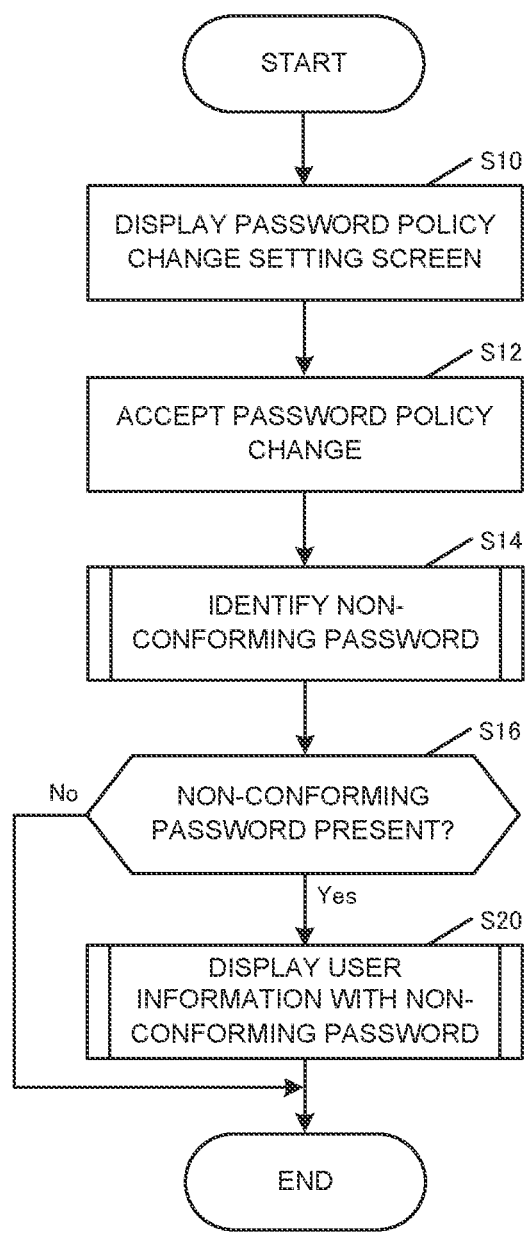

FIG. 8

| JOB TYPE | DEGREE OF URGENCY | SEVERITY OF DAMAGE | SUSCEPTIBILITY TO DAMAGE |
|---|---|---|---|
| PRINT | HIGH | HIGH (WITH PRINTING) | HIGH (REMOTE JOB) |
| COPY | MODERATE | HIGH (WITH PRINTING) | LOW (WALK-UP JOB) |
| SCAN | LOW | LOW (WITHOUT PRINTING) | LOW (WALK-UP JOB) |

<PASSWORD CHANGE REQUEST>

Dear EEFFGGHH

□□□□ SYSTEM  Contact: △△△△

<REGARDING PASSWORD CHANGE REQUEST>

DUE TO FOLLOWING PASSWORD POLICY CHANGE, YOUR PASSWORD NO LONGER CONFORMS TO POLICY. FOR THIS REASON, WE REQUEST YOU TO CHANGE YOUR PASSWORD.

1. ACCOUNT NAME: SEEFFGGHH
2. REASON FOR NON-CONFORMANCE OF PASSWORD: INSUFFICIENT NUMBER OF CHARACTERS (5 CHARACTERS OR MORE)
3. URL FOR PASSWORD SETTING: https:// aaa.bbb.ccc

QR CODE

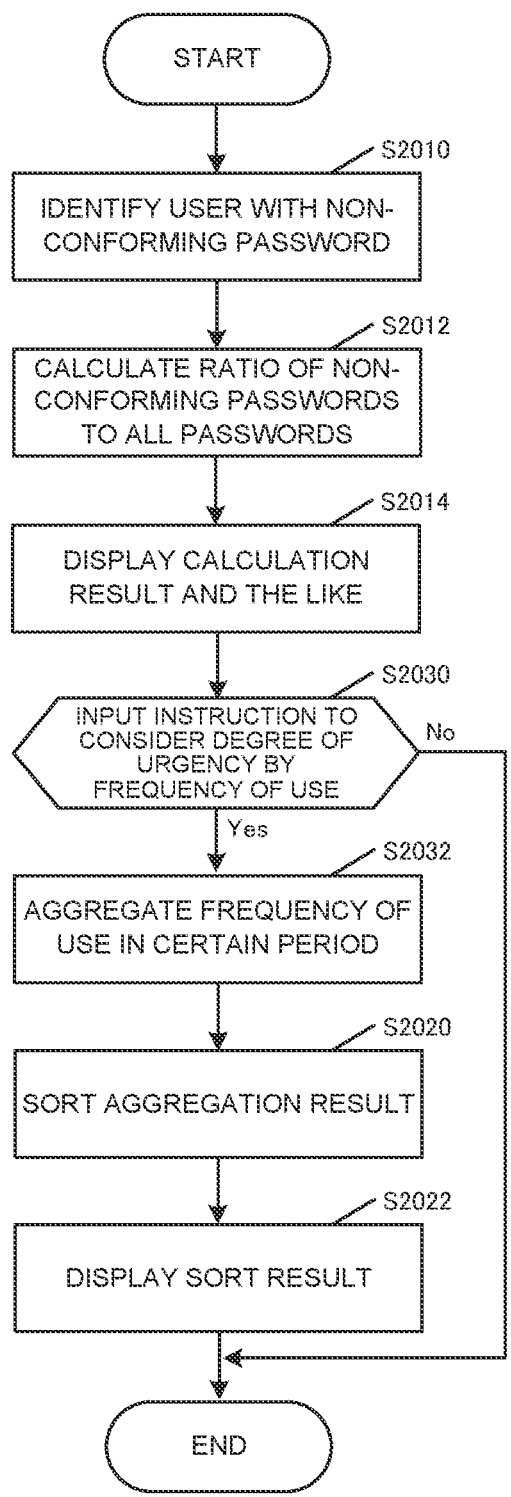

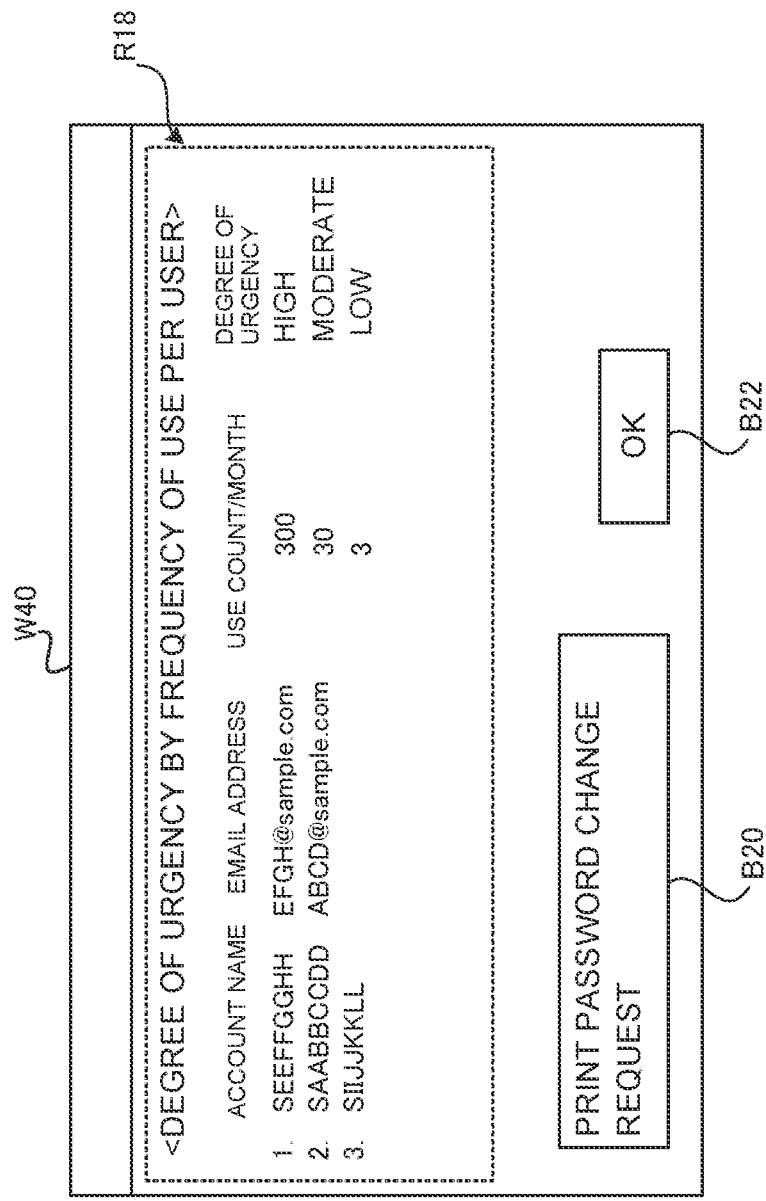

IMAGE PROCESSING APPARATUS AND CONTROL METHOD FOR IMAGE PROCESSING APPARATUS

BACKGROUND OF THE INVENTION

Field of the Invention

The present disclosure relates to an image processing apparatus and the like.

Description of the Background Art

In recent years, there has been a growing demand for security measures for image processing apparatuses, such as a multifunction peripheral, that are equivalent to those for network terminals such as a personal computer.

A password policy has been known as one of the measures to prevent unauthorized access to the image processing apparatus and to improve a security level. The password policy is requirements for the number of characters, a combination of characters, and the like set for a user account (hereinafter referred to as "authentication requirements"), and only passwords that satisfy such authentication requirements are authenticated.

As the related art regarding the password policy, for example, the following method is proposed. In the method, when the password policy for the multifunction peripheral is set, a password expiration date, the number of characters, presence or absence of a symbol, and the like are set on a user interface (UI) screen.

In general, in order to prevent a password theft and resulting damage, the password policy is set and changed by an administrator as needed according to a change in the security level required at the time.

In the related art, when a security policy is changed, it is impossible to acknowledge which or how many users who have already set the passwords are affected by the password policy change and how many users are required to change their passwords. This made it impossible to predict the scale of the password change and the scale of possible operational failure at the time when the password policy is applied.

The present disclosure has a purpose of providing an image processing apparatus and the like capable of predicting scale of a password change and scale of possible operational failure at the time when a password policy is applied.

SUMMARY OF THE INVENTION

In order to solve the above problem, an image processing apparatus according to the present disclosure includes: a storage that stores authentication information; and a controller that controls access by a user on the basis of the authentication information. In the case where an authentication requirement is changed, the controller identifies the authentication information that no longer satisfies the authentication requirement, and displays a ratio of pieces of the authentication information that no longer satisfy the authentication requirement to all pieces of the authentication information stored in the storage.

A control method for an image processing apparatus according to the present disclosure includes: storing authentication information; controlling access by a user on the basis of the authentication information; and, in the case where an authentication requirement is changed, identifying the authentication information that no longer satisfies the authentication requirement, and displaying a ratio of pieces of the authentication information that no longer satisfy the authentication requirement to all pieces of the stored authentication information.

The present disclosure can provide the image processing apparatus and the like capable of predicting scale of the password change and scale of possible operational failure when the password policy is applied.

BRIEF DESCRIPTION OF THE DRAWINGS

FIG. 2 is a diagram for illustrating a functional configuration of the multifunction peripheral according to the first embodiment.

FIG. 3A is a table for illustrating authentication information. FIG. 3B is a table for illustrating user information. FIG. 3C is a table for illustrating authentication requirements.

FIG. 4A includes tables for illustrating job history information. FIG. 4B is a table for illustrating login operation information.

FIG. 5 is a flowchart for illustrating a processing flow according to the first embodiment.

FIG. 8 is a view for illustrating a difference in degree of urgency by job type.

FIG. 12 is a view for illustrating yet another operation example according to the first embodiment.

FIG. 13 is a flowchart for illustrating a processing flow according to a second embodiment.

FIG. 14 is a view for illustrating an operation example according to the second embodiment.

DESCRIPTION OF THE PREFERRED EMBODIMENTS

A description will hereinafter be made on embodiments of the present disclosure with reference to the accompanying drawings. In the present disclosure, a multifunction peripheral capable of executing jobs in a print mode, a copy mode, a scan mode, and the like will be described as an example of the image processing apparatus. The following embodiments are merely examples for describing the present disclosure, and the technical scope of the description in the claims is not limited to the following description.

In the present disclosure, a description will be made on an aspect in which password authentication is used as user authentication for the multifunction peripheral. The password authentication is a method for authenticating identity of a user by using a combination of an identifier (ID), which is assigned to uniquely identify the user who logs in to the multifunction peripheral, and a password set in association with the ID (or an account name). The following description will be made on the assumption that the password is designed as a character string in which specific letters, numbers, symbols, and the like are combined to have the predetermined number of characters, and is stored in advance in the multifunction peripheral together with the ID or the account name. In the present disclosure, the ID, the account name, and the password may be distinguished, as authentication information, from other types of information.

1. First Embodiment

A multifunction peripheral according to a first embodiment includes: a storage that stores authentication information; and a controller that controls access to the user on the basis of the authentication information. When an authentication requirement is changed, the controller identifies the authentication information that no longer satisfies the authentication requirement, and displays a ratio of the authentication information no longer satisfying the authentication requirement to all pieces of the authentication information stored in the storage.

1.1 Functional Configuration

Figure 1:
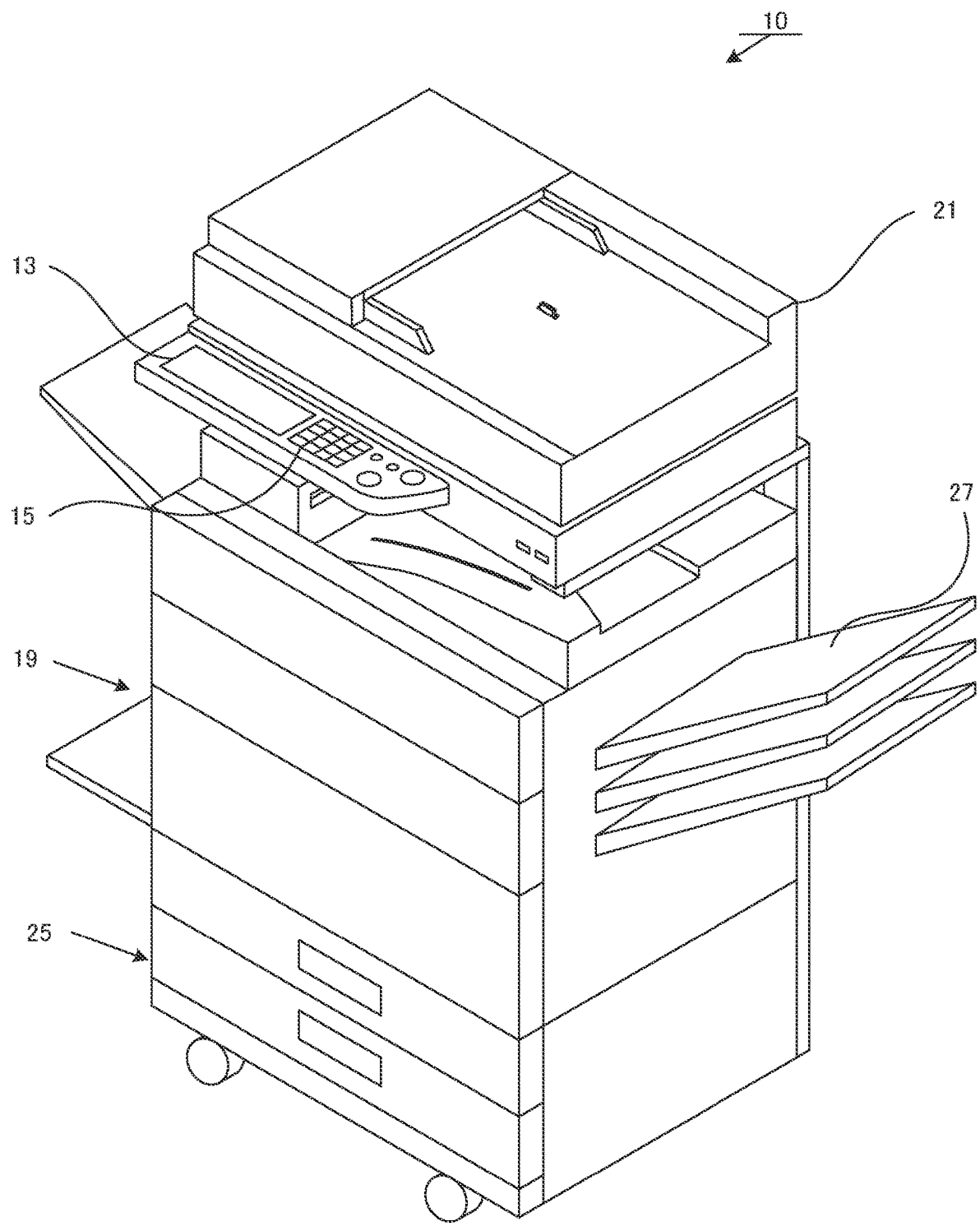
FIG. 1 is a view for schematically illustrating an overall configuration of a multifunction peripheral according to a first embodiment.

A description will be made on a configuration of a multifunction peripheral 10 according to the first embodiment with reference to FIGS. 1 and 2. FIG. 1 is an external perspective view for schematically illustrating an overall configuration of the multifunction peripheral 10. FIG. 2 is a functional configuration diagram of the multifunction peripheral 10. The multifunction peripheral 10 includes a controller 11, a display device 13, an operation input device 15, a communicator 17, an image forming device 19, an image reader 21, and a storage 23.

The controller 11 controls the entire multifunction peripheral 10. The controller 11 includes, for example, one or more arithmetic devices (such as central processing units (CPUs)). The controller 11 reads and executes various programs stored in the storage 23 to implement functions thereof.

The display device 13 displays various types of information to the user or the like. The display device 13 can include, for example, a liquid-crystal display (LCD) or an organic electro-luminescence (EL) display, for example.

The operation input device 15 accepts input of the information by the user or the like. The operation input device 15 can include hard keys (for example, a numeric keypad), buttons, and the like. However, the operation input device 15 can also be configured a touch panel that allows the input via the display device 13. When the operation input device 15 is configured as the touch panel capable of displaying a software keyboard together with the display device 13, a typical method, such as a resistive method, an infrared method, an electromagnetic induction method, or a capacitive sensing method, can be used as an input method for the touch panel.

The communicator 17 includes one or both of wired and wireless interfaces to communicate with another device via a network (NW) such as a local area network (LAN), a wide area network (WAN), the Internet, or a public switched telephone network. The communicator 17 can also include an interface for near-field communication such as Bluetooth®, Wi-Fi®, Wi-SUN®, or IrDA.

The image forming device 19 forms an image based on image data on a sheet as a recording medium. The image forming device 19 feeds the sheet from a sheet feeder 25, forms the image based on the image data on the sheet, and thereafter discharges the sheet from a sheet discharger 27. The image forming device 19 can include, for example, a laser printer using an electrophotographic method. The image forming device 19 forms the image by using toner supplied from toner cartridges, which are not illustrated. Each of the toner cartridges corresponds to a toner color (for example, cyan, magenta, yellow, or black).

The image reader 21 scans and reads a printed document (a document image) to be read, and then generates image data. The image reader 21 can be, for example, configured as a scanner device including an image sensor such as a charge coupled device (CCD) or a contact image sensor (CIS). The configuration of the image reader 21 is not limited as long as the image reader 21 can output the image data by reading a reflected light image from the printed document with the image sensor.

The storage 23 stores the various programs required for operation of the multifunction peripheral 10 and various types of data. The storage 23 can include, for example, storage devices such as random-access memory (RAM), a hard disk drive (HDD), a solid state drive (SSD), and read only memory (ROM).

In the first embodiment, the storage 23 stores a job execution program 231, a display processing program 232, and an authentication program 233, and secures an authentication information storage area 234, a user information storage area 235, an authentication requirement storage area 236, and a log information storage area 237.

The job execution program 231 is a program that is read by the controller 11 to execute processing in each mode such as the print mode, the copy mode, or the scan mode on a job-by-job basis. The controller 11 reads the job execution program 231, and controls the display device 13, the operation input device 15, the communicator 17, the image forming device 19, the image reader 21, and the like to execute the job. The controller 11 that has read the job execution program 231 can generate information on the execution of the job as job history information, which will be described below, and store such information in the log information storage area 237.

The display processing program 232 is a program that is read by the controller 11 at the time of controlling the display device 13 and the operation input device 15. The controller 11 that has read the display processing program 232 displays password policy change setting screen, an impact degree display screen, an urgency degree check screen, or the like, which will be described below. In the present disclosure, a description will be made that the controller 11 controls the input/output to the touch panel in which the display device 13 and the operation input device 15 are integrated. However, the display device 13 and the operation input device 15 can be separate components that are controlled independently.

The authentication program 233 is a program that is read by the controller 11 at the time of authenticating the user who attempts to log in to the multifunction peripheral 10. The controller 11 that has read the authentication program 233 controls the password authentication in general. In addition, the controller 11 implements each of functions, which will be described below, by reading respective one of subprograms such as an authentication information registration program 2331, a user information registration program 2332, an authentication requirement setting program 2333, an authentication requirement determination program 2334, and a notification order determination program 2335 included in the authentication program 233.

The authentication information registration program 2331 is a program that is read by the controller 11 at the time of registering the authentication information of the user who desires an operation on the multifunction peripheral 10. The controller 11 that has read the authentication information registration program 2331 stores, as the authentication information, the account name and the password, which are input via an unillustrated input screen, in association with the ID in the authentication information storage area 234.

The user information registration program 2332 is a program that is read by the controller 11 at the time of registering information on the user who desires the operation on the multifunction peripheral 10 (hereinafter referred to as user information). The controller 11 that has read the user information registration program 2332 stores, as the user information, the user information such as a user name, an e-mail address, and group affiliation that are input via an unillustrated input screen in association with the ID in the user information storage area 235.

The authentication requirement setting program 2333 is a program that is read by the controller 11 at the time of accepting settings related to a password policy as the authentication requirement. The controller 11 that has read the authentication requirement setting program 2333 accepts settings related to the required number of characters (a character length), required character types (a combination of character types), and the like input by an administrator as the password policy. The controller 11 stores the accepted password policy in the authentication requirement storage area 236.

The authentication requirement determination program 2334 is a program that is read by the controller 11 at the time of determining whether the password already stored in the authentication information storage area 234 conforms to the password policy as the authentication requirement. The controller 11 that has read the authentication requirement determination program 2334 refers to the password policy stored in the authentication requirement storage area 236, evaluates the password stored in the authentication information storage area 234, and thereby determines conformance of the password to the password policy.

The notification order determination program 2335 is a program that is read by the controller 11 at the time of determining a notification order in the case that there are plural passwords that do not conform to the password policy. The controller 11 that has read the notification order determination program 2335 determines the notification order of the password according to a degree of urgency (a priority of the user who should respond immediately) as will be described below.

The authentication information storage area 234 is a storage area where the authentication information is stored. Here, FIG. 3A is a table for illustrating a data configuration example of the authentication information according to the first embodiment.

FIG. 3A illustrates an example in which, as the authentication information, the account name, the password, and last password update date and time are stored in association with the ID. For example, an account name "SAABBCCDD" and a password "hellow1" are associated with an ID "#001", which indicates that the password "hellow1" is last updated on "2021/01/11".

The user information storage area 235 is a storage area where the user information is stored. Here, FIG. 3B is a table for illustrating a data configuration example of the user information according to the first embodiment.

FIG. 3B illustrates an example in which, as the user information, user name, e-mail address, and group affiliation are stored in association with the ID. For example, a user name "EEFFGGHH", an e-mail address "EFGH@sample.com", and group affiliation "ADMINISTRATOR" are associated with an ID "#002". The group affiliation exemplified in FIG. 3B represents a name of a group to which the corresponding user belongs, and an operating privilege for the multifunction peripheral 10 is granted according to the group. For example, the group "ADMINISTRATOR" is a group to which the users with administrative privileges for the multifunction peripheral 10 belong. A group "GENERAL USER" is a group to which general users who are not granted the administrative privilege for the multifunction peripheral 10 but have no restriction on job execution. A group "GUEST USER" is a group to which guest users whose executable jobs are more restricted than the general users belong. By the way, the user information exemplified herein only includes the information on the user name, the e-mail address, and the group affiliation. However, the user information is not limited to the example illustrated in FIG. 3B. For example, the user information can include any information as long as such information is the information on the user, such as a contact telephone number, a contact fax number, address, work address, and work telephone number.

The authentication requirement storage area 236 is a storage area where the authentication requirement is stored. Here, FIG. 3C is a table for illustrating a data configuration example of the authentication requirement according to the first embodiment.

FIG. 3C illustrates an example in which, the authentication requirements, the required number of characters and the required character types (the combination of the character types) are stored. In FIG. 3C, an authentication requirement "01" represents an example of the authentication requirement prior to a password policy change. For example, the authentication requirement "01" indicates that the required number of characters for the authenticatable password is "3" characters or more and that the setting does not require inclusion of any required character types related to an upper case letter, a lower case letter, or a number. Meanwhile, the authentication requirement "02" represent an example of the authentication requirements after the password policy change. For example, the authentication requirement "02" indicates that the required number of characters for the authenticatable password is "5" characters or more and that the inclusion of the required character types related to the upper case letter, the lower case letter, and the number. FIG. 3C exemplifies items related to the password policy as the authentication requirements only represent items related to the required number of characters and the required character types. However, in addition to these items, the items related to the password policy can also include items such as password expiration date prohibition of reuse of the same password, for example.

The log information storage area 237 is a storage area where the job history information about the jobs executed by the multifunction peripheral 10 and login operation information such as the number of logins by the user to the multifunction peripheral 10 and the number of failed login attempts thereto as log information. Here, a description will be made on the log information according to the first embodiment. FIG. 4A is a table for illustrating a data configuration example of the job history information according to the first embodiment. FIG. 4B is a table for illustrating a data configuration example of the login operation information according to the first embodiment.

The job history information exemplified in FIG. 4A is information in which execution history of the jobs in each of the modes, such as the print mode, the copy mode, and the scan mode, is stored as history information. The job history information can include a job ID for uniquely identifying the job, job execution date and time, a job type, and the number of printed (consumed) sheets when the job type involves printing on the sheets as consumables such as print, copy, or fax. For example, the job history information exemplified on the top page of FIG. 4A is an example of the job history information related to the jobs executed by the user name "EEFFGGHH". Here, for example, the job related to the job ID "JB000295" includes the job history information about the job type "PRINT" executed at "2022/11/14 11:00", and indicates that "10" sheets are printed (consumed) by the execution of the "PRINT" job.

As exemplified in FIG. 4A, the job history information also has an aspect as the execution history of the jobs executed by a particular user on the multifunction peripheral 10. Accordingly, by using the history items recorded in the job history information as keys for searching and aggregating, it is possible to systematically comprehend the job type frequently used by the particular user (the number of execution of the particular job type), the number of consumed consumables, and the like.

The login operation information exemplified in FIG. 4B is information that records the account name, the number of logins to the multifunction peripheral 10, and the number of failed login attempts thereto in association with the ID. For example, the login operation information pertaining to ID"#002" illustrated in FIG. 4B is the login operation information pertaining to the account name "SEEF-FGGHH", which It represents that the user has logged in to the multifunction peripheral 10 "300" times and failed to log in 10 times during one month.

As exemplified in FIG. 4B, the login operation information can be used as an index to comprehend use frequency of the multifunction peripheral 10 by the user.

1.2 Processing Flow

Figure 6:
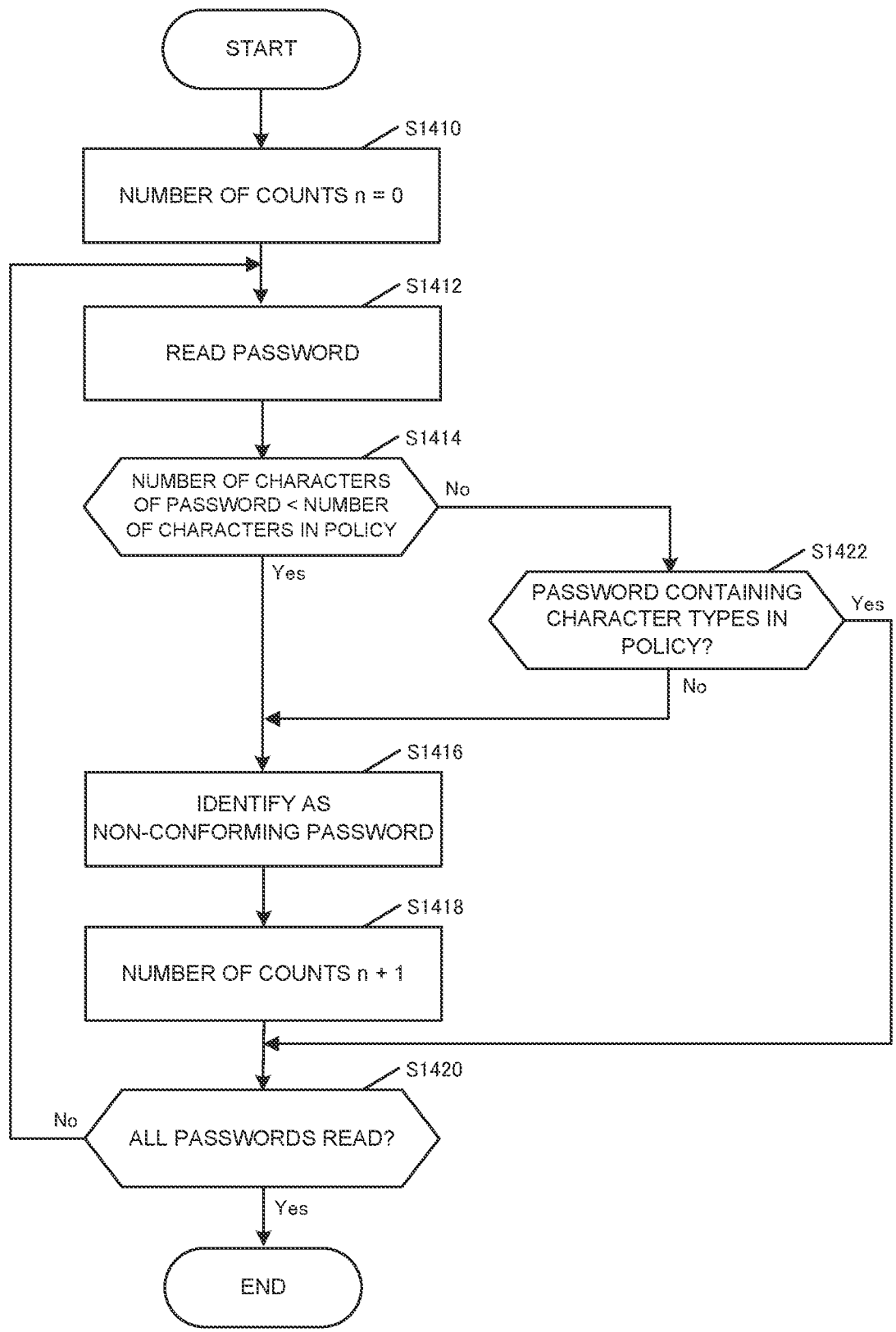
FIG. 6 is a flowchart for illustrating another processing flow according to the first embodiment.
Figure 7:
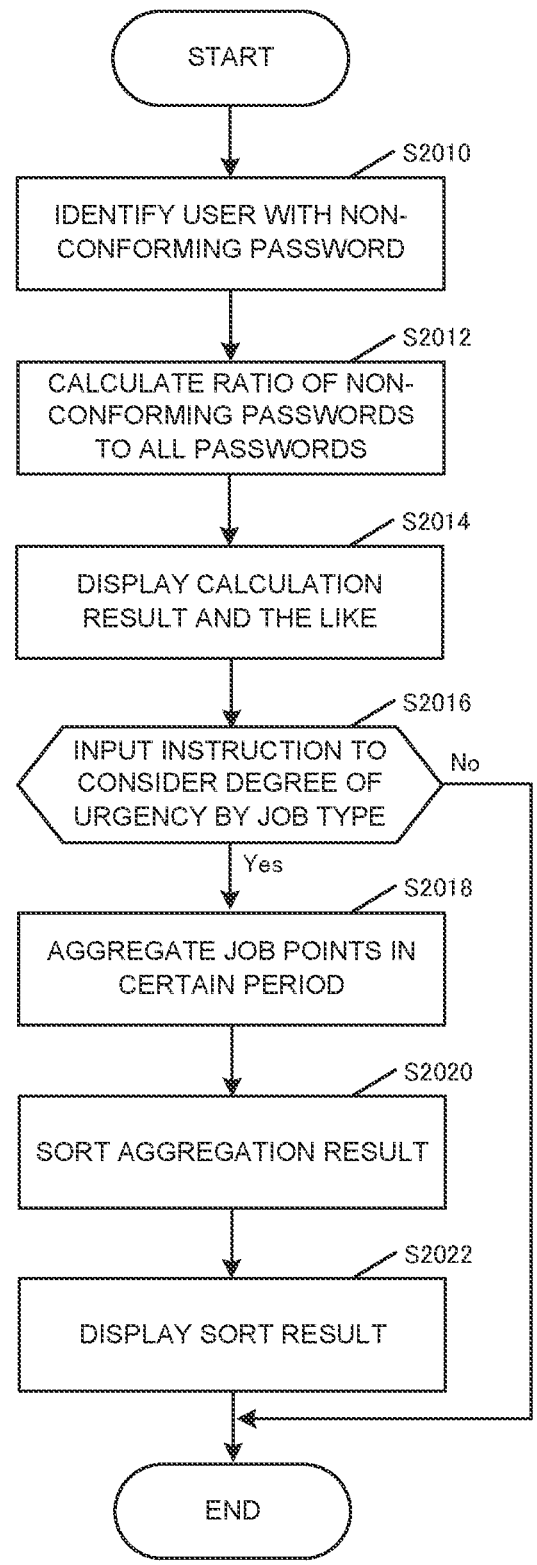
FIG. 7 is a flowchart for illustrating further another processing flow according to the first embodiment.

Next, a description will be made on a processing flow according to the first embodiment. FIG. 5 is a flowchart for illustrating an overall processing flow according to the first embodiment. FIG. 6 is a flowchart for illustrating processing related to step S14 in FIG. 5, and FIG. 7 is a flowchart for illustrating processing related to step S20 in FIG. 5. Here, a description will be made on the assumption that, prior to the processing described with reference to FIG. 5 and the like, the controller 11 reads the authentication information registration program 2331, the user information registration program 2332, and the like of the authentication program 233 and that setting of the authentication information and the user information is completed.

First, the controller 11 displays the password policy change setting screen on the display device 13 by reading the authentication requirement setting program 2333, the display processing program 232, and the like (step S10).

Next, the controller 11 accepts the settings that are related to the password policy change and are input by the user (the administrator) (step S12).

The controller 11 reads the authentication requirement determination program 2334 and identifies the password that does not conform to the requirements in the password policy (a non-conforming password) due to the password policy change in step S12 among the passwords that have already been set (step S14).

If, as a result of the processing to identify the non-conforming password, it is determined that the non-conforming password is present, the controller 11 reads the notification order determination program 2335, the display processing program 232, and the like, and executes processing related to display of the user information with the non-conforming password (step S16; Yes→step S20). On the other hand, if it is determined that the non-conforming password is not present, the controller 11 terminates the processing (step S16; No→END).

Next, a description will be made on the processing to identify the non-conforming password related to step S14 in FIG. 5 with reference to the flowchart in FIG. 6. The processing herein processing that is executed by the controller 11 on the basis of the authentication requirement (the authentication requirement "02" in FIG. 3C) that is associated with the password policy change.

First, the controller 11 sets the number of counts n of the non-conforming password to "0" (step S1410).

Next, the controller 11 retrieves the password stored in the authentication information storage area 234 (step S1412). Then, the controller 11 compares the number of characters making up the read password (the number of characters of the password) with the number of characters changed due to the password policy change (the number of characters in the policy) to determine whether the number of characters of the password falls below the number of characters in the policy (step S1414).

If it is determined that the number of characters of the password falls below the number of characters in the policy, the controller 11 identifies the password read in step S1412 as the non-conforming password (step S1414; Yes→step S1416).

Then, the controller 11 adds "1" to the number of counts n of the non-conforming password (step S1418).

Next, the controller 11 determines whether all the passwords have been read (step S1420). If it is determined that all the passwords have been read, the controller 11 terminates the processing (Step S1420; Yes→END). On the other hand, if it is determined that reading of all the passwords has not been completed, the processing returns to step S1412, and the controller 11 reads the next password and executes the processing in step S1414 onward.

By the way, if it is determined in step S1414 that the number of characters of the password is equal to or larger than the number of characters in the policy, the controller 11 determines whether the password contains the required character types (policy character types) related to the upper case letter, lower case letter, and the number (step S1414; No→step S1422).

If it is determined that the password does not contain the required character types, the controller 11 determines that the password is the non-conforming password (step S1422; No→step S1416). On the other hand, if it is determined that the password contains the required character types, the processing proceeds to step S1420 (step S1422; Yes→step S1420).

Next, a description will be made on display processing of the user information with the non-conforming password related to step S20 in FIG. 5 with reference to the flowchart in FIG. 7.

First, the controller 11 identifies user with the non-conforming password (step S2010). In this case, the controller 11 only needs to identify the user information on the basis of the ID, with which the authentication information including the non-conforming password is associated.

Next, the controller 11 calculates a ratio of the non-conforming password to all the passwords stored in the authentication information storage area 234 (step S2012).

Then, the controller 11 displays a calculation result and the like on the display device 13 (step S2014).

Next, the controller 11 determines whether an instruction to consider the degree of urgency by job type for the calculation result displayed in step S2014 has been input thereto (step S2016).

Here, a description will be made on the degree of urgency by job type. In the present disclosure, a response priority is set for the user who is affected by the password policy change, such as the already set password becoming no longer conforming, and who should respond immediately, and the response priority is expressed by the degree of urgency.

To change the password policy is a measure to prevent a password theft and resulting damage associated therewith. In the case where susceptibility to the damage and a severity of the damage vary by a certain condition at the time when the password is stolen, the response priority at the time of the password policy becoming non-conforming also varies by the condition.

In regard to the multifunction peripheral, the consumption of the consumables (resources; the sheets and the toner) is considered as a specific example of the significant image. It can be said that, based on a perspective of a magnitude of the consumption of the consumables, the damage to the job not involving printing is less significant while the damage to the job involving printing is significant.

In addition, in regard to the multifunction peripheral, likeliness of use of the stolen password (the susceptibility to the damage) varies by whether the job is a walk-up job or not. Here, the walk-up job means a job that is executed by the user who directly operates the multifunction peripheral. In general, the multifunction peripherals are often installed in highly shared locations such as workplaces and living rooms, and even when the password is stolen, it is considered that someone using the stolen password is less likely to approach and operate the multifunction peripheral. Accordingly, based on the perspective of the susceptibility to the damage, it is considered that the walk-up job is less likely to be damaged while the job that is executed by operating the multifunction peripheral from a remote location (a remote job) is likely to be damaged.

FIG. 8 is a table that summarizes a difference in the degree of urgency by job type (print, copy, scan). As described above, the degree of urgency is highest for the print job type, of which both of the severity of the damage and the susceptibility to the damage are high. Next, the degree of urgency of the copy job type, of which the severity of the damage is high and the susceptibility to the damage is low, is moderate. Meanwhile, the degree of urgency of the scan job type, of which both of the severity of the damage and the susceptibility to the damage are low, is low.

From what have been described so far, when determining that the instruction to consider the degree of urgency by job type has been input, the controller 11 executes the display processing in consideration of the degree of urgency by job type. By considering the degree of urgency by job type, it is possible to accurately identify the user whose degree of urgency is high, that is, who requires the immediate response.

Referring back to FIG. 7, if determining that the instruction to consider the degree of urgency by job type has been input, the controller 11 aggregates job points in a certain period (step S2016; Yes→step S2018). Here, the job point represents a weighted point that is assigned to the job executed by the user within a certain period according to job type. For example, 3 points are assigned per print job, 2 points are assigned per copy job, and 1 point is assigned per scan job. The job type and the number of execution of the job (execution frequency) that is executed by the user can be found by referring to the job history information exemplified in FIG. 4A.

The controller 11 executes sorting processing of an aggregation result of the job points, displays a sorting result as the notification order on the display device 13, and then terminates the processing (step S2020→step S2022). At this time, characters used to display the notification order may be displayed in different colors, fonts, or sizes. By the way, if determining that the instruction to consider the degree of urgency by job type has not been input, the controller 11 terminates the processing (step S2016; No→END).

1.3 Operation Example

Figure 9:
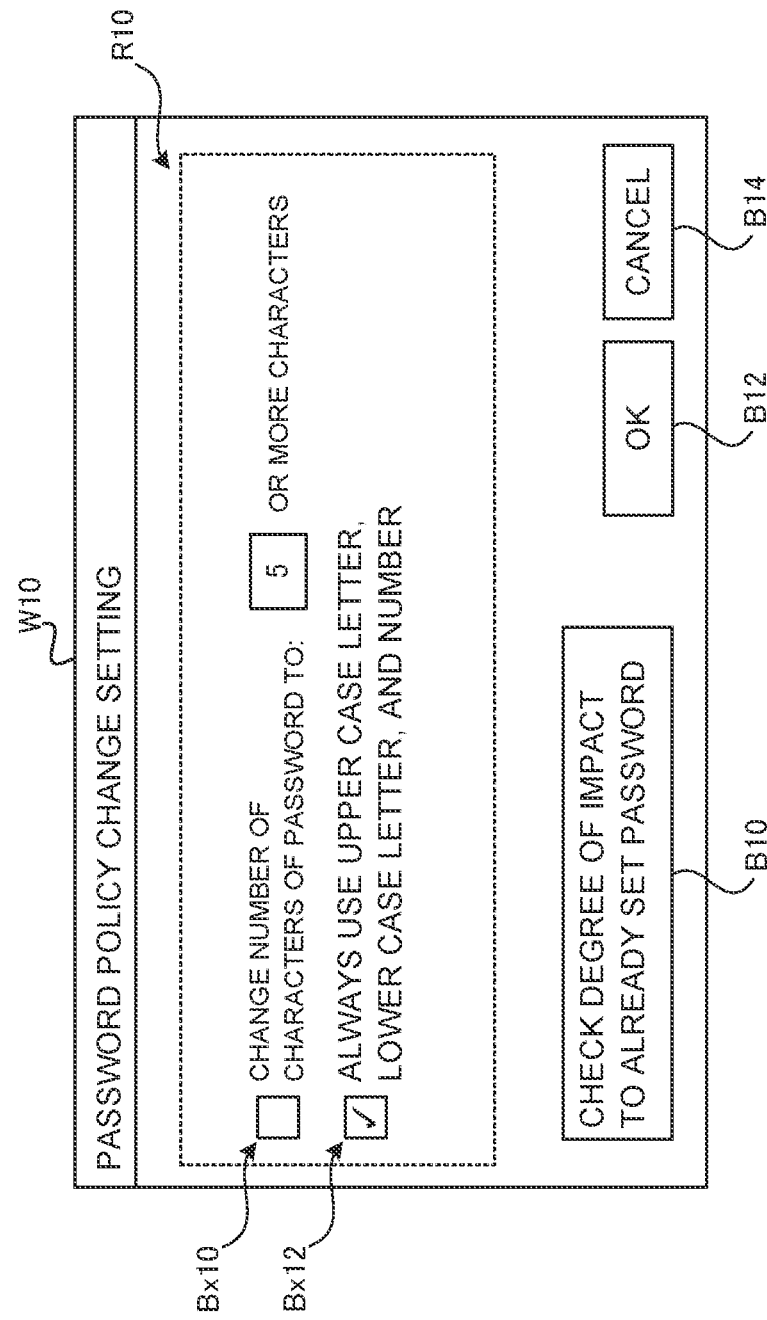
FIG. 9 is a view for illustrating an operation example according to the first embodiment.

Next, a description will be made on an operation example according to the first embodiment. FIG. 9 is a view for illustrating a configuration example of a password policy change setting screen W10. The password policy change setting screen W10 includes a password policy change setting area R10, an impact degree display button B10, an OK button B12, and a cancel button B14.

The password policy change setting area R10 includes a required number of characters setting check box Bx10 and a required character type setting check box Bx12. The required number of characters setting check box Bx10 accepts a setting of the required number of characters that make up the password. When setting the number of characters that make up the password, the user ticks the required number of characters setting check box Bx10 and sets the desired number of characters. Meanwhile, the required character type setting check box Bx12 accepts a setting of the character types of characters that make up the password. FIG. 9 illustrates an example in which the upper case letter, the lower case letter, and the number are set as the required character types that make up the password. In the case where the upper case letter, the lower case letter, and the number are set as the required character types that make up the password, the user can set those by ticking the required character type setting check box Bx12. Contents set in the password policy change setting area R10 are stored as the authentication requirements in the authentication requirement storage area 236 (see the authentication requirement "02" in FIG. 3C).

The impact degree display button B10 is a button that accepts a display instruction for an impact degree display screen W20, which will be described with reference to FIG. 10.

The OK button B12 is a button that accepts a confirmation instruction of input of the settings in the password policy change setting area R10. The cancel button B14 is a button that accepts a cancellation instruction of the input of the settings in the password policy change setting area R10.

Figure 10:
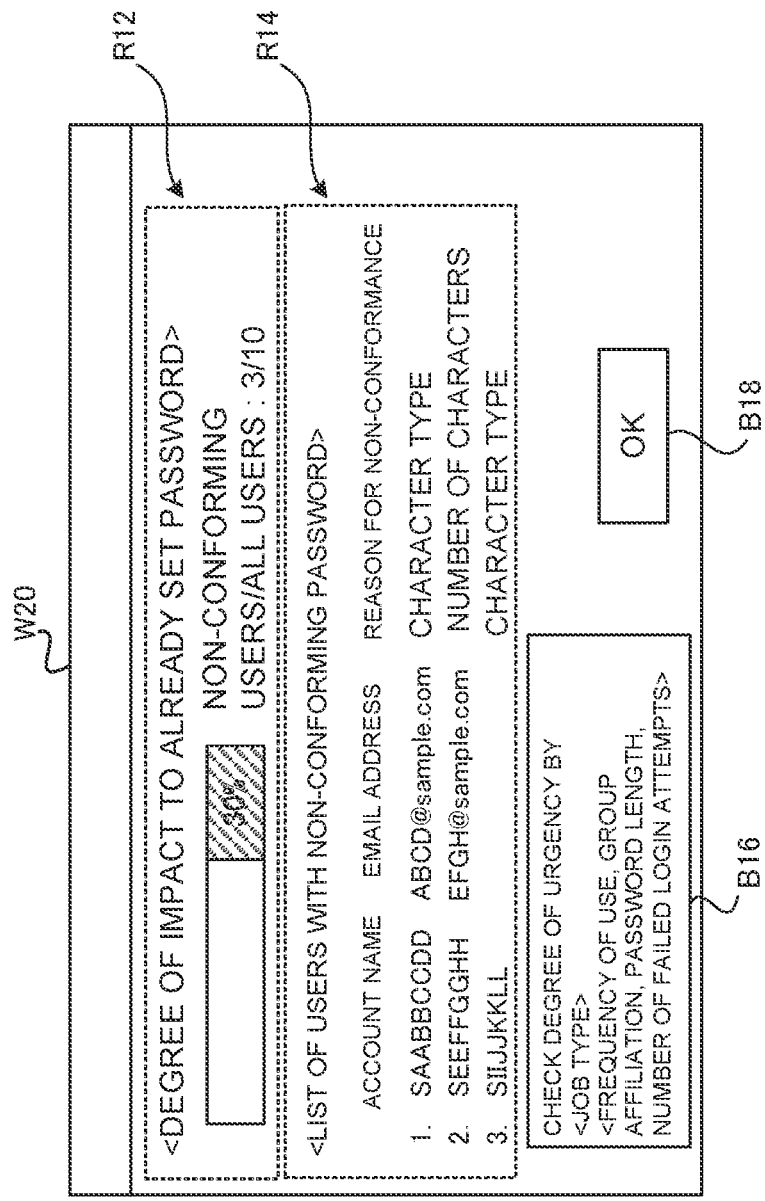
FIG. 10 is a view for illustrating another operation example according to the first embodiment.

FIG. 10 is a view for illustrating a configuration example of the impact degree display screen W20 that is displayed by the controller 11 when the impact degree display button B10 in FIG. 9 is selected. The impact degree display screen W20 is a display screen that displays, to the user, an impact of the password policy change in the password policy change setting area R10 on the password that has already been set.

The impact degree display screen W20 includes a degree of impact display area R12, a non-conforming user list display area R14, an urgency degree check button B16 by <job type>, and an OK button B18.

The degree of impact display area R12 is an area where the calculation result that is obtained in step S2012 illustrated in FIG. 7 by calculating the ratio of the non-conforming passwords, which no longer satisfy the password authentication requirements due to the password policy change, to all the passwords, which have already been set and stored in the authentication information storage area 234 (corresponds to step S2012 and step S2014 in FIG. 7).

FIG. 10 illustrates an example of representing a result of the 3 passwords that no longer conform due to the password policy change among the 10 already set passwords by a band graph (a 100% stacking horizontal bar). Just as described, by displaying the ratio of the non-conforming passwords by the graph, the administrator can visually comprehend the ratio of the passwords that are affected by the password policy change.

The non-conforming user list display area R14 is an area where the account name of the user with the non-conforming password, the e-mail address as the user information, and a reason for non-conformance. FIG. 10 illustrates an example in which the passwords held by the account names "SAABBCCDD", "SEEFFGGHH", and "SIIJJKKLL" have become non-conforming. Here, the users with the non-conforming passwords are represented by the account names. However, an aspect of displaying the users by the user names can also be adopted. In addition, FIG. 10 illustrates an example in which the e-mail address is displayed as the user information of the user. However, in the case where the user information exemplified in FIG. 3B includes the contact telephone number or the like, such a contact telephone number or the like may be displayed. As the content of the non-conformance, the reason for the non-conformance due to the password policy change is displayed. The reason for the non-conformance of the account name "SAABBCCDD" is the character type (does not contain the required character types, see the ID "#001" in FIG. 3A). Meanwhile, the reason for the non-conformance of the account name "SEEFFGGHH" is the number of characters (not the required number of characters, see the ID "#002" in FIG. 3A). Furthermore, the reason for the non-conformance of the account name "SIIJJKKLL" is the character type (not contain the required character types, see the ID "#003" in FIG. 3A).

The urgency degree check button B16 by <job type> is a button that accepts selection of a display instruction for an urgency degree check screen W30 by job type, which will be described with reference to FIG. 11. Here, <use frequency, group affiliation, password length, and number of failed login attempts> will be used for the description of a second embodiment onward.

The OK button B18 is a button that is used by the user to approve the contents displayed in the degree of impact display area R12 and the non-conforming user list display area R14.

Figure 11:
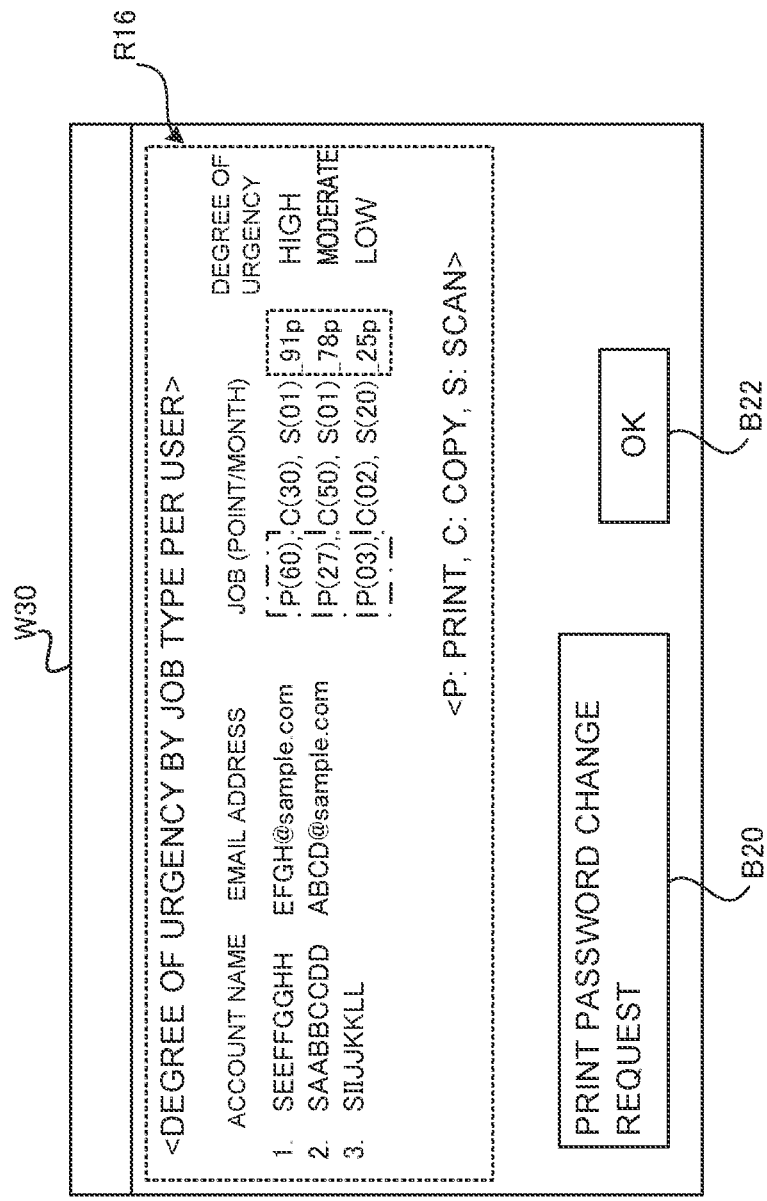
FIG. 11 is a view for illustrating further another operation example according to the first embodiment.

FIG. 11 is a view for illustrating a configuration example of the urgency degree check screen W30 by job type that is displayed by the controller 11 when the urgency degree check button B16 by <job type> in FIG. 10 is selected.

The urgency degree check screen W30 by job type includes an urgency degree check area R16 by job type, a print button B20, and an OK button B22.

The urgency degree check area R16 by job type is an area where the aggregation result of the job points in a certain period is subjected to the sorting processing and the sorting result is displayed (corresponding to the processing in step S2018 to step S2022 in FIG. 7). The urgency degree check area R16 by job type is provided with check items including the account name, the e-mail address, the job (points/month), and the degree of urgency. The account name and the e-mail address are the same items as those described for the non-conforming user list display area R14 illustrated in FIG. 10. In the job (points/month), the number of execution of the jobs that have been executed by the user indicated by the account name on the multifunction peripheral 10 in a certain period (one month) is expressed in points per job type. For example, it is indicated that the user with the account name "SEEFFGGHH" has executed the print job 20 times (20×3 points="P(60)" points), the copy job 15 times (15×2 points="C(30)" points), and the scan job once (1×1 point="S(1)" point) in one month.

The degree of urgency indicates the priority of the user who should respond immediately. Here, the degree of urgency is indicated by a result that is obtained by comparing the points of the print job (surrounded by a one-dot chain line in FIG. 11) to determine the degree of urgency per user. FIG. 11 illustrates an example in which the degree of urgency of the user with the account name "SEEFFGGHH" is determined as "HIGH". The degree of urgency can be determined by evaluating a total point as indicated in a dotted frame in the urgency degree check area R16 by job type, in addition to the setting of the degree of urgency by job type (see FIG. 8). The total point is obtained from a sum of the points of the print job, the copy job, and the scan job.

The Print button B20 is a button that accepts an instruction to print and output a password change request, which will be described with reference to FIG. 12.

The OK button B22 is a button that accepts approval of the contents displayed in the urgency degree check area R16 by job type.

FIG. 12 is a view for illustrating a configuration example of an output screen P10 on which the controller 11 prints and outputs the password change request by controlling the image forming device 19 when the print button B20 in FIG. 11 is selected.

The output screen P10 has a content of requesting the user, whose password has become non-conforming due to the password policy change, to change the password. For example, FIG. 12 illustrates an example of notifying the user name "EEFFGGHH" (the account name: SEEFFGGHH) of the content of the non-conformance of the password and a URL for password setting to change the password.

By distributing a request with the content exemplified in FIG. 12 as a printed matter to the non-conforming user, it is possible to clearly indicate that the request is not a phishing scam or the like but a request from the legitimate administrator. However, as exemplified in FIG. 3B, it can also be configured that the content exemplified in FIG. 12 is sent to the e-mail address of the user whose contact such as the e-mail address is registered as the user information.

As it has been described so far, according to the first embodiment, it is possible to predict the scale of the password change and the scale of possible operational failure at the time when the password policy is applied. In particular, it is possible to accurately identify the user who needs to respond immediately by considering the degree of urgency by job type.

2 Second Embodiment

The second embodiment is an aspect of executing the display processing, for which the use frequency of the multifunction peripheral is taken into consideration. For example, in the case where the password is stolen, there is a possibility that a malicious attacker changes the password against intention of the account holder and, when it is no longer possible to log in to the multifunction peripheral, it becomes inconvenient to perform work using the multifunction peripheral. Accordingly, the password theft has a significant impact on the user who frequently uses the multifunction peripheral. In the second embodiment, of the users with the passwords that have become non-conforming due to the password policy change, the users with the high use frequency of the multifunction peripheral are identified, and a notification order is then determined.

2.1 Functional Configuration

A functional configuration of a multifunction peripheral according to the second embodiment can have the same functional configuration as the multifunction peripheral 10 according to the first embodiment. Thus, the same components as those of the multifunction peripheral 10 according to the first embodiment will be denoted by the same reference numerals, and the description thereon will not be made.

2.2 Processing Flow

In a processing flow according to the second embodiment, the flowchart in FIG. 7 according to the first embodiment is replaced with a flowchart illustrated in FIG. 13, and the rest of the processing will be the same. The processing illustrated in FIG. 13 that is the same as the processing in steps described in FIG. 7 will be denoted by the same step numbers, and the description thereon will not be made.

In step S2014 illustrated in FIG. 13, the controller 11 displays the calculation result and the like on the display device 13.

Next, the controller 11 determines whether the instruction to consider the degree of urgency by use frequency of the multifunction peripheral 10 for the calculation result displayed in step S2014 has been input thereto (step S2030).

If determining that the instruction to consider the degree of urgency by use frequency of the multifunction peripheral 10 has been input, the controller 11 aggregates use frequency of the multifunction peripheral 10 in a certain period (step S2030; Yes→step S2032). For the use frequency of the multifunction peripheral 10, it is only needed to refer to the number of logins in the login operation information exemplified in FIG. 4B.

The controller 11 executes sorting processing of an aggregation result of the use frequency, displays a sorting result as the notification order on the display device 13, and then terminates the processing (step S2020→step S2022). By the way, if determining that the instruction to consider the degree of urgency by use frequency has not been input, the controller 11 terminates the processing (step S2030; No→END).

2.3 Operation Example

Next, a description will be made on an operation example according to the second embodiment.

FIG. 14 is a view for illustrating a configuration example of an urgency degree check screen W40 by use frequency that is displayed by the controller 11 when the urgency degree check button B16 by <use frequency> in FIG. 10 is selected. The same components as those described for the urgency degree check screen W30 by job type will be denoted by the same reference numerals, and the description thereon will not be made.

The urgency degree check screen W40 by use frequency includes an urgency degree check area R18 by use frequency, the print button B20, and the OK button B22.

The urgency degree check area R18 by use frequency is an area where the aggregation result of the use frequency in a certain period is subjected to the sorting processing and the sorting result is displayed (corresponding to the processing in step S2032 to step S2022 in FIG. 13). The urgency degree check area R18 by use frequency is provided with check items including the account name, the e-mail address, the use frequency/month, and the degree of urgency. The account name and the e-mail address are the same items as those described for the non-conforming user list display area R14 illustrated in FIG. 10. As the use frequency/month, the number of times the user indicated by the account name has used the multifunction peripheral 10 within a certain period (one month) is displayed. For example, it indicates that the user with the account name "SEEFFGGHH" has used the multifunction peripheral 10 "300" times in one month.

The degree of urgency indicates the priority of the user who should respond immediately. Here, a determination result of the degree of urgency per user is indicated by comparing the number of use (use frequency) of the multifunction peripheral 10. FIG. 14 illustrates an example in which the degree of urgency of the user with the account name "SEEFFGGHH" is determined as "HIGH".

As it has been described so far, according to the second embodiment, it is possible to predict the scale of the password change and the scale of the possible operational failure at the time when the password policy is applied. In particular, it is possible to accurately identify the user who needs to respond immediately by considering the degree of urgency by use frequency of the multifunction peripheral.

3 Third Embodiment

A third embodiment is an aspect of executing the display processing, for which the group affiliation of the user is taken into consideration. An administrator group (the administrator user who belongs thereto) has the administrative privileges, such as deleting all pieces of the data stored in the multifunction peripheral and adding a new user. Accordingly, the impact of the password policy change varies by whether the user belongs to the administrator group or one of a general user group and a guest group other than the administrator group. In the third embodiment, of the users with the passwords that have become non-conforming due to the password policy change, the users who belong to the administrator group are identified, and a notification order is then determined.

3.1 Functional Configuration

A functional configuration of a multifunction peripheral according to the third embodiment can have the same functional configuration as the multifunction peripheral 10 according to the first embodiment. Thus, the same components as those of the multifunction peripheral 10 according

3.2 Processing Flow

Figure 15:
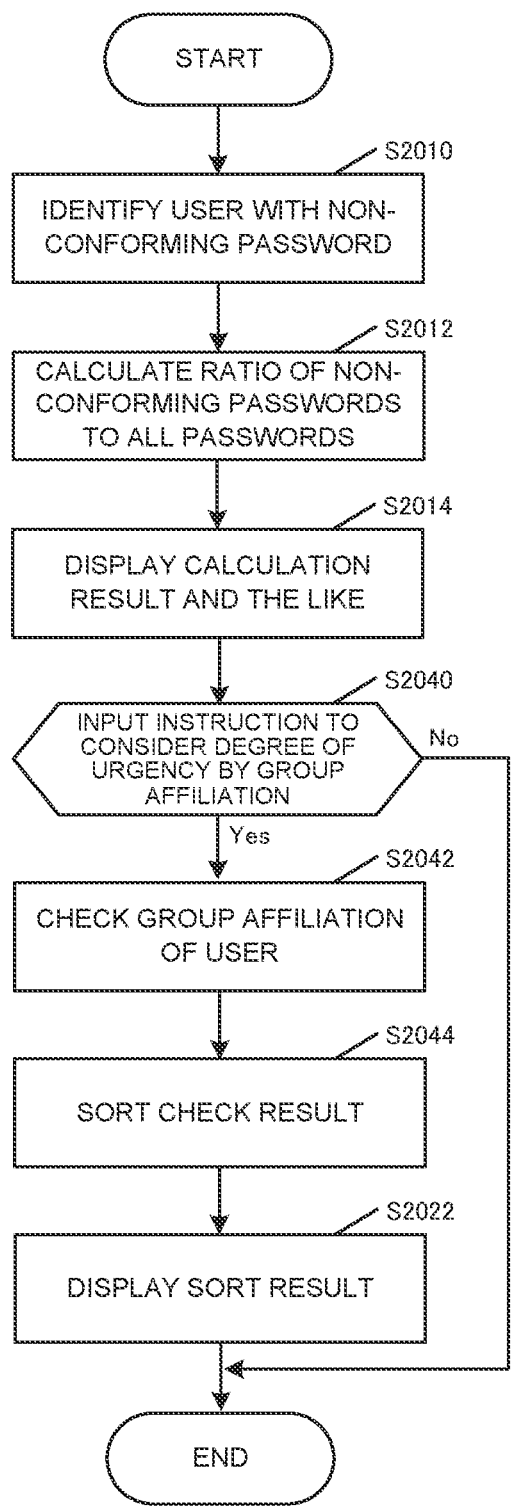
FIG. 15 is a flowchart for illustrating a processing flow according to a third embodiment.

In a processing flow according to the third embodiment, the flowchart in FIG. 7 according to the first embodiment is replaced with a flowchart illustrated in FIG. 15, and the rest of the processing will be the same. The processing illustrated in FIG. 15 that is the same as the processing in steps described in FIG. 7 will be denoted by the same step numbers, and the description thereon will not be made.

In step S2014 illustrated in FIG. 15, the controller 11 displays the calculation result and the like on the display device 13.

Next, the controller 11 determines whether an instruction to consider the degree of urgency by group affiliation for the calculation result displayed in step S2014 has been input thereto (step S2040).

If determining that the instruction to consider the degree of urgency by group affiliation has been input, the controller 11 checks the group affiliation of the user (step S2040; Yes→step S2042). For the group affiliation of the user, it is only needed to refer to the user information exemplified in FIG. 3B.

The controller 11 executes sorting processing of a check result, displays a sorting result as the notification order on the display device 13, and then terminates the processing (step S2044→step S2022). By the way, if determining that the instruction to consider the degree of urgency by group affiliation has not been input, the controller 11 terminates the processing (step S2040; No→END).

3.3 Operation Example

Next, a description will be made on an operation example according to the third embodiment.

Figure 16:
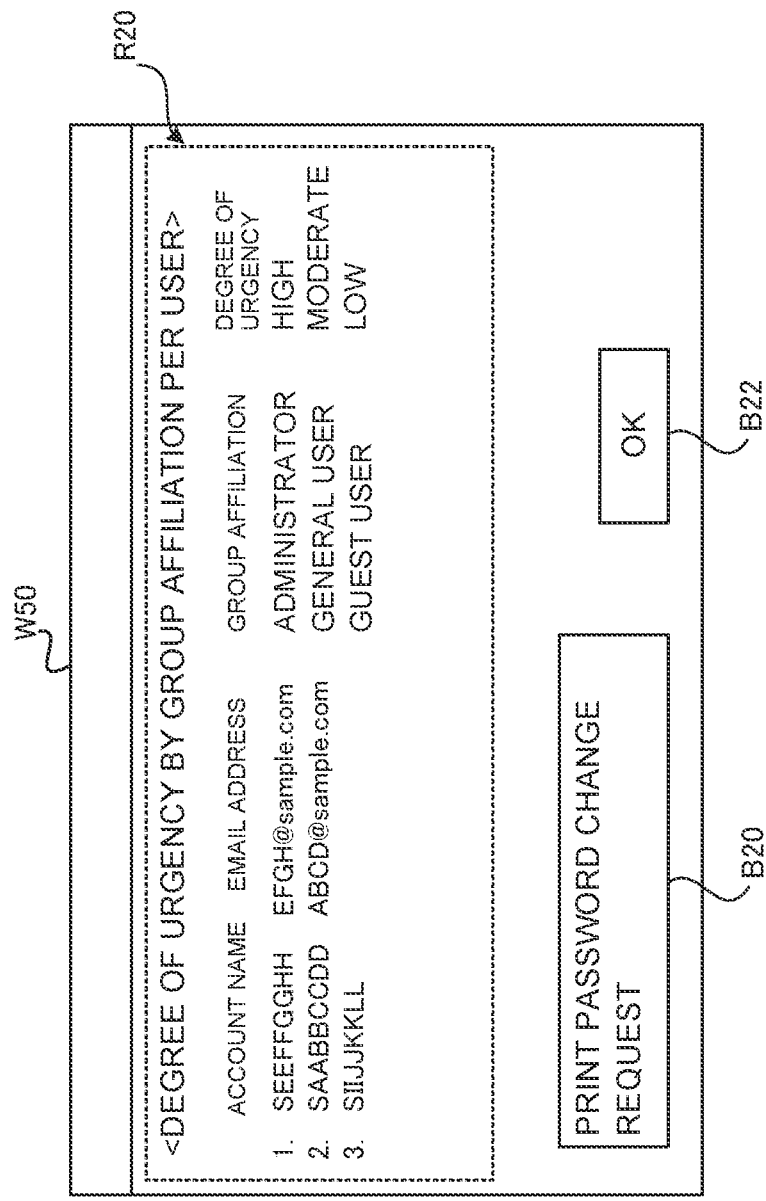
FIG. 16 is a view for illustrating an operation example according to the third embodiment.

FIG. 16 is a view for illustrating a configuration example of an urgency degree check screen W50 by group affiliation that is displayed by the controller 11 when the urgency degree check button B16 by <group affiliation> in FIG. 10 is selected. The same components as those described for the urgency degree check screen W30 by job type will be denoted by the same reference numerals, and the description thereon will not be made.

The urgency degree check screen W50 by group affiliation includes an urgency degree check area R20 by group affiliation, the print button B20, and the OK button B22.

The urgency degree check area R20 by group affiliation is an area where the aggregation result of the group affiliation, to which the users belong, is subjected to the sorting processing and the sorting result is displayed (corresponding to the processing in step S2042 to step S2022 in FIG. 15). The urgency degree check area R20 by group affiliation is provided with check items including the account name, the e-mail address, the group affiliation, and the degree of urgency. The account name and the e-mail address are the same items as those described for the non-conforming user list display area R14 illustrated in FIG. 10. As the group affiliation, group affiliation, to which the user indicated by the account name belongs, is displayed. For example, it indicates that the user with the account name "SEEFFGGHH" belongs to the "administrator group".

The degree of urgency indicates the priority of the user who should respond immediately. Here, the determination result of the degree of urgency per user is indicated by checking the group affiliation of the user. FIG. 16 illustrates an example in which the degree of urgency of the user with the account name "SEEFFGGHH" is determined as "HIGH".

As it has been described so far, according to the third embodiment, it is possible to predict the scale of the password change and the scale of the possible operational failure at the time when the password policy is applied. In particular, it is possible to accurately identify the user who needs to respond immediately by considering the degree of urgency by group affiliation of the user.

4. Fourth Embodiment

A fourth embodiment is an aspect of executing the display processing, for which the number of characters (hereinafter referred to as the password length in the fourth embodiment) set by the user is taken into consideration, as an aspect of solving a vulnerability of the password. While the password in the short password length (such as that with less than five characters) is easily attacked by the attacker, the password in the long password length (such as that with five characters or more) is not easily attacked by the attacker. Thus, these two types of the password differ in terms of the susceptibility to the damage. Thus, the impact of the password policy change varies by password length. In the fourth embodiment, the password length (the number of characters) of the password that has become non-conforming due to the password policy change is determined, the users with the passwords in the short password lengths are identified, and a notification order is then determined.

4.1 Functional Configuration

A functional configuration of a multifunction peripheral according to the fourth embodiment can have the same functional configuration as the multifunction peripheral 10 according to the first embodiment. Thus, the same components as those of the multifunction peripheral 10 according to the first embodiment will be denoted by the same reference numerals, and the description thereon will not be made.

4.2 Processing Flow

Figure 17:
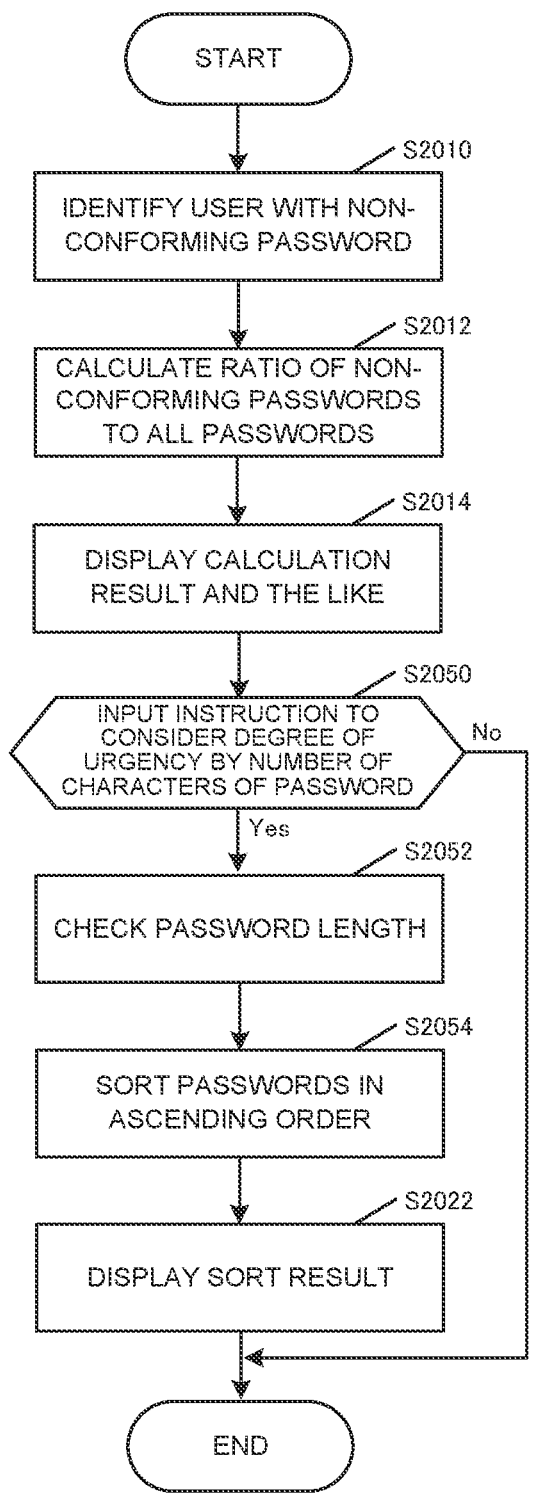
FIG. 17 is a flowchart for illustrating a processing flow according to a fourth embodiment.

In a processing flow according to the fourth embodiment, the flowchart in FIG. 7 according to the first embodiment is replaced with a flowchart illustrated in FIG. 17, and the rest of the processing will be the same. The processing illustrated in FIG. 17 that is the same as the processing in steps described in FIG. 7 will be denoted by the same step numbers, and the description thereon will not be made.

In step S2014 illustrated in FIG. 17, the controller 11 displays the calculation result and the like on the display device 13.

Next, the controller 11 determines whether an instruction to consider the degree of urgency by password length for the calculation result displayed in step S2014 has been input thereto (step S2050).

If determining that the instruction to consider the degree of urgency by password length has been input, the controller 11 checks the password length (the number of characters) (step S2050; Yes→step S2052). For the password length (the number of characters), it is only needed to refer to the authentication information exemplified in FIG. 3A.

The controller 11 executes sorting processing of the number of characters of the passwords in an ascending order, displays a sorting result as the notification order on the display device 13, and then terminates the processing (step S2054→step S2022). By the way, if determining that the instruction to consider the degree of urgency by password length has not been input, the controller 11 terminates the processing (step S2050; No→END).

4.3 Operation Example

Next, a description will be made on an operation example according to the fourth embodiment.

Figure 18:
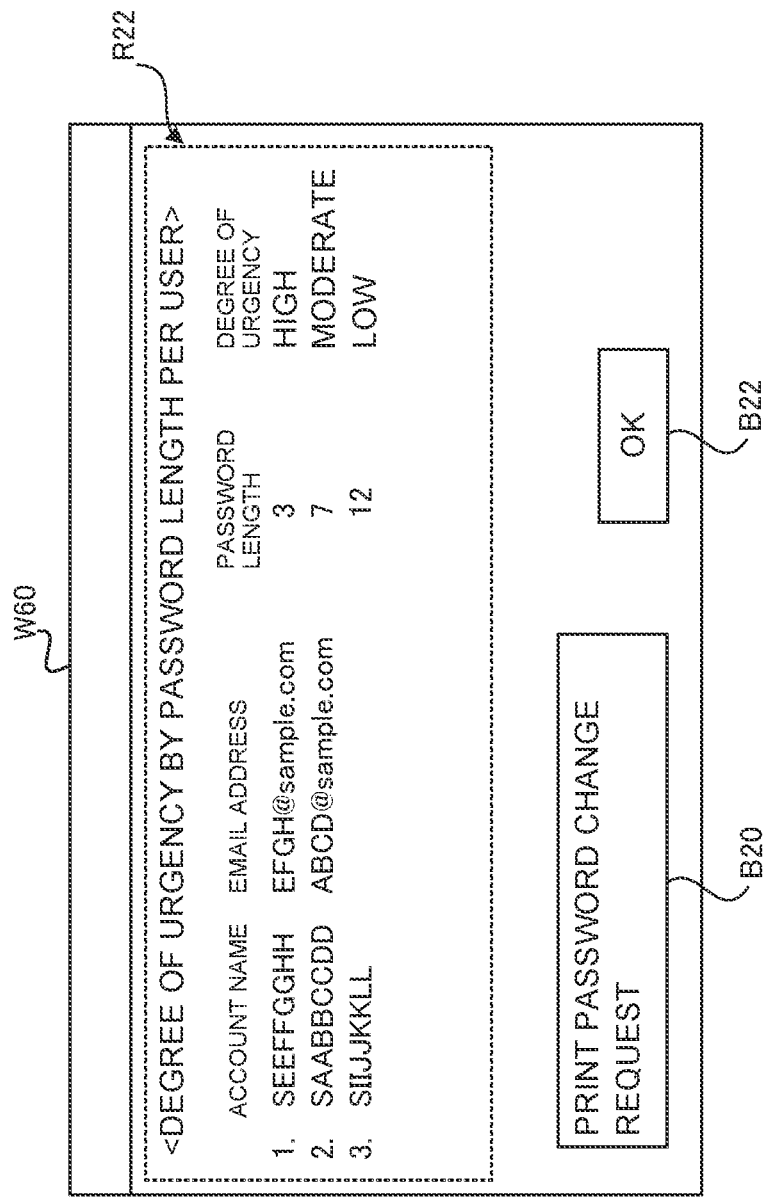
FIG. 18 is a view for illustrating an operation example according to the fourth embodiment.

FIG. 18 is a view for illustrating a configuration example of an urgency degree check screen W60 by password length that is displayed by the controller 11 when the urgency degree check button B16 by <password length> in FIG. 10 is selected. The same components as those described for the urgency degree check screen W30 by job type will be denoted by the same reference numerals, and the description thereon will not be made.

The urgency degree check screen W60 by password length includes an urgency degree check area R22 by password length, the print button B20, and the OK button B22.

The urgency degree check area R22 by password length is an area where the check result of password length (the number of characters) set by the user is subjected to the sorting processing and the sorting result is displayed (corresponding to the processing in step S2052 to step S2022 in FIG. 17). The urgency degree check area R22 by password length is provided with check items including account name, e-mail address, password length, and degree of urgency. The account name and the e-mail address are the same items as those described for the non-conforming user list display area R14 illustrated in FIG. 10. As the password length, the number of characters of the password that is set by the user indicated by the account name is displayed. For example, it indicates that the number of characters of the password set by the user with the account name "SEEFFGGHH" is "3" characters.

The degree of urgency indicates the priority of the user who should respond immediately. Here, the determination result of the degree of urgency per user is indicated by checking the number of characters of the password. FIG. 18 illustrates an example in which the degree of urgency of the user with the account name "SEEFFGGHH" is determined as "HIGH".

As it has been described so far, according to the fourth embodiment, it is possible to predict the scale of the password change and the scale of the possible operational failure at the time when the password policy is applied. In particular, it is possible to accurately identify the user who needs to respond immediately by considering the degree of urgency by password length (the number of characters of the password) that is set by the user.

5 Fifth Embodiment

A fifth embodiment is an aspect of executing the display processing, for which the number of failed login attempts is taken into consideration. There is a case of login failure due to a password input error. In the case where the number of failed login attempts (failure frequency) is high, there is a possibility of a brute force attack on the password. In the fifth embodiment, of the users with the passwords that have become non-conforming due to the password policy change, the users with the large number of the failed login attempts are identified, and a notification order is then determined.

5.1 Functional Configuration

A functional configuration of a multifunction peripheral according to the fifth embodiment can have the same functional configuration as the multifunction peripheral 10 according to the first embodiment. Thus, the same components as those of the multifunction peripheral 10 according to the first embodiment will be denoted by the same reference numerals, and the description thereon will not be made.

5.2 Processing Flow

Figure 19:
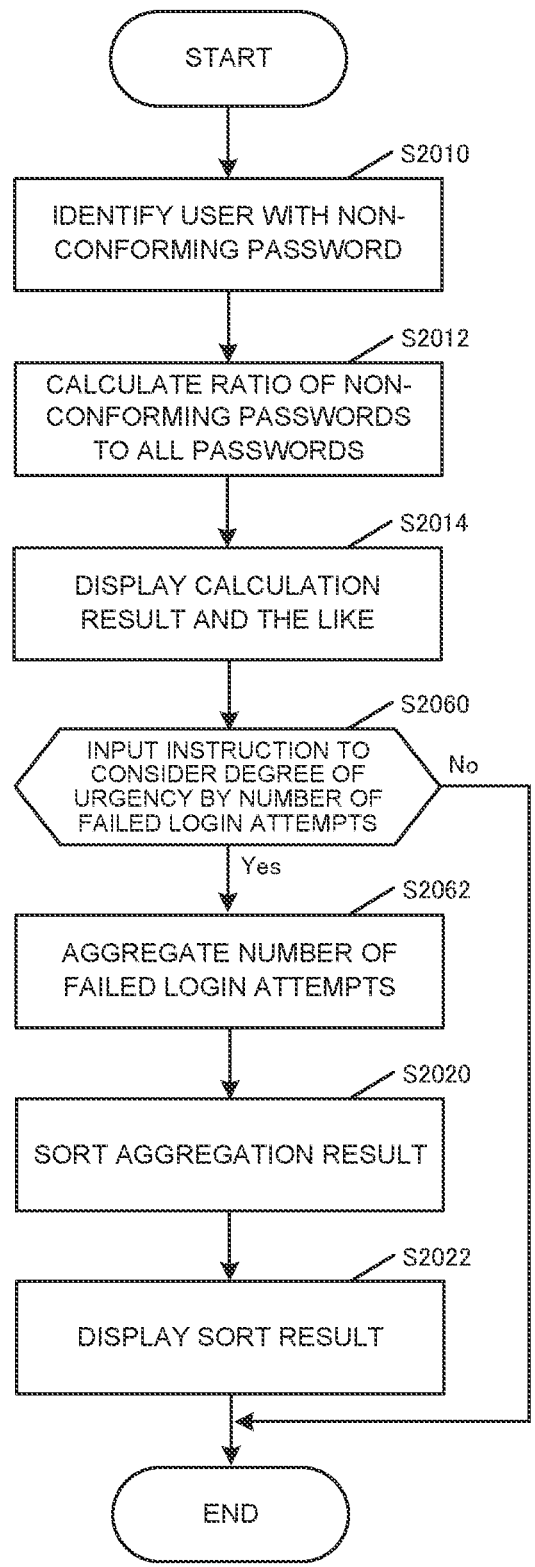
FIG. 19 is a flowchart for illustrating a processing flow according to a fifth embodiment.

In a processing flow according to the fifth embodiment, the flowchart in FIG. 7 according to the first embodiment is replaced with a flowchart illustrated in FIG. 19, and the rest of the processing will be the same. The processing illustrated in FIG. 19 that is the same as the processing in steps described in FIG. 7 will be denoted by the same step numbers, and the description thereon will not be made.

In step S2014 illustrated in FIG. 19, the controller 11 displays the calculation result and the like on the display device 13.

Next, the controller 11 determines whether an instruction to consider the degree of urgency by number of failed login attempts for the calculation result displayed in step S2014 has been input thereto (step S2060).

If determining that the instruction to consider the degree of urgency by number of failed login attempts has been input, the controller 11 aggregates number of failed login attempts in a certain period (step S2060; Yes→step S2062). For number of failed login attempts, it is only needed to refer to the login operation information exemplified in FIG. 4B.

The controller 11 executes sorting processing of an aggregation result of number of failed login attempts, displays a sorting result as the notification order on the display device 13, and then terminates the processing (step S2020→step S2022). By the way, if determining that the instruction to consider the degree of urgency by number of failed login attempts has not been input, the controller 11 terminates the processing (step S2060; No→END).

5.3 Operation Example

Next, a description will be made on an operation example according to the fifth embodiment.

Figure 20:
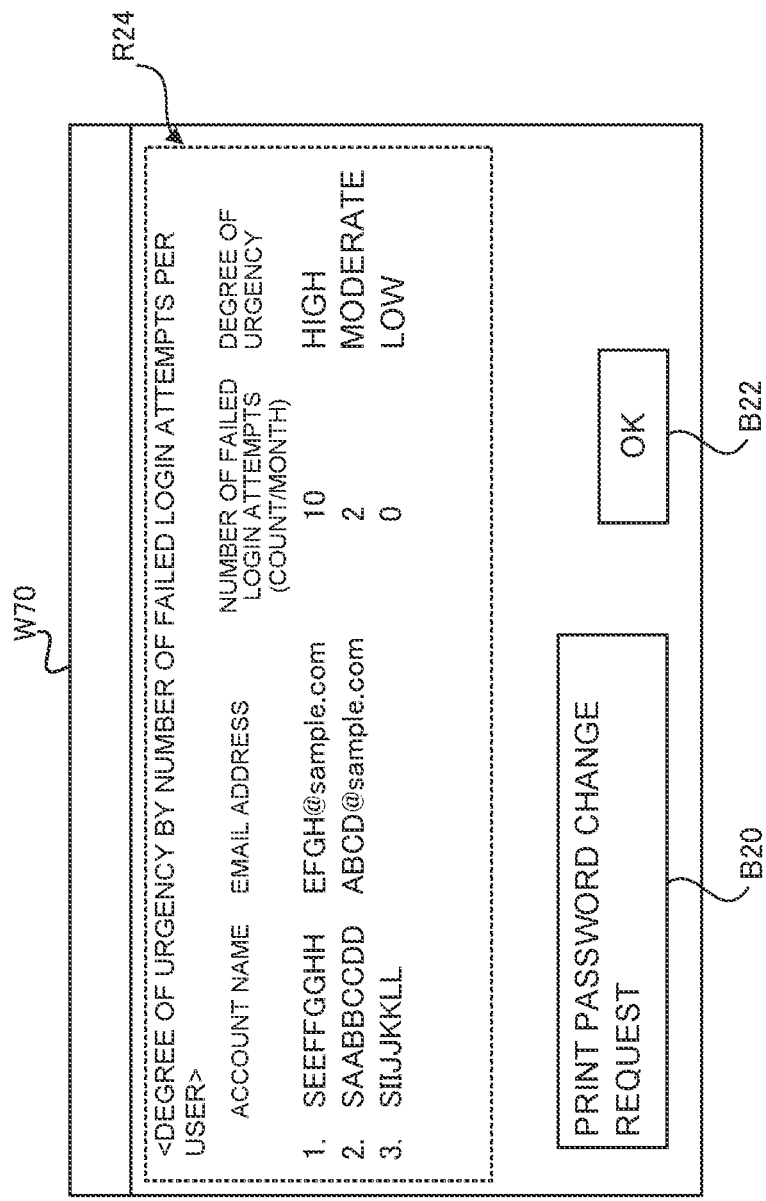
FIG. 20 is a view for illustrating an operation example according to the fifth embodiment.

FIG. 20 is a view for illustrating a configuration example of an urgency degree check screen W70 by number of failed login attempts that is displayed by the controller 11 when the urgency degree check button B16 by <number of failed login attempts> in FIG. 10 is selected. The same components as those described for the urgency degree check screen W30 by job type will be denoted by the same reference numerals, and the description thereon will not be made.

The urgency degree check screen W70 by number of failed login attempts includes an urgency degree check area R24 by number of failed login attempts, the print button B20, and the OK button B22.

The urgency degree check area R24 by number of failed login attempts is an area where the aggregation result of number of failed login attempts to the multifunction peripheral 10 is subjected to the sorting processing and the sorting result is displayed (corresponding to the processing in step S2062 to step S2022 in FIG. 19). The urgency degree check area R24 by number of failed login attempts is provided with check items including the account name, the e-mail address, number of failed login attempts (count/month), and the degree of urgency. The account name and the e-mail address are the same items as those described for the non-conforming user list display area R14 illustrated in FIG. 10. As the number of failed login attempts (count/month), the number of times the user indicated by the account name has failed to log in a certain period (one month) is displayed. For example, it indicates that the user with the account name "SEEFFGGHH" has failed to log in "10" times in the certain period (one month).

The degree of urgency indicates the priority of the user who should respond immediately. Here, a determination result of the degree of urgency per user is indicated by aggregating number of failed login attempts to the multifunction peripheral 10. FIG. 20 illustrates an example in which the degree of urgency of the user with the account name "SEEFFGGHH" is determined as "HIGH".

As it has been described so far, according to the fifth embodiment, it is possible to predict the scale of the password change and the scale of the possible operational failure at the time when the password policy is applied. In particular, it is possible to accurately identify the user who needs to respond immediately by considering the degree of urgency by number of failed login attempts to the multifunction peripheral.

In this embodiment, the description has been made on the aspect in which the response priority is set for the user who is affected by the password policy change, such as the already set password becoming no longer conforming, and who should respond immediately. However, the response priority may be set not only for the user who is affected by the password policy change but for all the set users.

In this embodiment, the description has been made only on the password authentication as the authentication method for the multifunction peripheral. However, the authentication method for the multifunction peripheral is not limited thereto. For example, multifactor authentication may be adopted in which property authentication, biometric authentication, or the like is further combined with the password authentication.

The present disclosure is not limited to the above-described embodiments, and various modifications can be made. That is, embodiments obtained by combining technical measures modified as appropriate within a range that does not depart from the gist of the present disclosure are also included in the technical scope of the present disclosure.

Although some parts of the above-described embodiments are separately described for convenience of the description, it is needless to say that the embodiments may be combined and implemented within a technically allowable range.

The program to be operated on each of the devices in the embodiments is a program that controls the CPU or the like (a program that makes a computer function) so as to implement the functions in the above-described embodiments. The embodiments assume a device in which plural programs are executed simultaneously as needed by multitask processing. The information handled by the devices is temporarily accumulated in a temporary storage device (for example, a RAM) during processing of the information, and then, is stored in various storage devices such as a read-only memory (ROM) and an HDD, and is read, modified, and written by the CPU as necessary.

A recording medium used for storing the program may be any one of a semiconductor medium (for example, ROM, a non-volatile memory card, or the like), an optical recording medium or a magnetooptical recording medium (for example, a digital versatile disc (DVD), a magnetooptical disc (MO), a mini disc (MD), a compact disc (CD), a Blu-ray® disc (BD), or the like), and a magnetic recording medium (for example, a magnetic tape, a flexible disk, or the like). Moreover, not only are the functions of the embodiments described above implemented by execution of a loaded program, but the functions of the present disclosure may also be implemented by processing performed in cooperation with an operating system or other application programs, etc., on the basis of an instruction of the program.

Furthermore, in a case where the programs are to be distributed to the market, the programs may be stored in a portable recording medium for distribution or transferred to a server computer connected via a network, such as the Internet. In this case, a storage device of the server computer is also included in the present disclosure as a matter of course.

What is claimed is:

1. An image processing apparatus comprising:
   a storage that stores authentication information; and
   a controller that controls access by a user based on the authentication information, wherein
   in a case that an authentication requirement is changed, the controller is configured to:
   identify authentication information that no longer satisfies the authentication requirement,
   display a ratio of pieces of the authentication information that no longer satisfies the authentication requirement to all pieces of the authentication information stored in the storage, and
   determine a notification order of user information corresponding to the identified authentication information based on a job type related to image processing as a predetermined priority.

2. The image processing apparatus according to claim 1, wherein
   the controller is further configured to determine that the notification order of the job type that is remotely operable and involves consumption of a consumable is the highest.

3. The image processing apparatus according to claim 1, wherein
   the controller is further configured to determine the notification order based on a usage frequency of the image processing apparatus as the predetermined priority.

4. The image processing apparatus according to claim 1, wherein
   the controller is further configured to determine the notification order based on a privilege granted to a group, to which the user belongs, as the predetermined priority.

5. The image processing apparatus according to claim 1, wherein
   the controller is further configured to determine the notification order based on a vulnerability of the authentication information as the predetermined priority.

6. The image processing apparatus according to claim 1, wherein
   the controller is further configured to determine the notification order based on a number of characters of a password.

7. The image processing apparatus according to claim 1, wherein
   the controller is further configured to determine the notification order based on a number of failed authentication operations on the image processing apparatus as the predetermined priority.

8. The image processing apparatus according to claim 1, wherein
   the controller is further configured to display a reason as to why the authentication requirement is no longer satisfied and the user information corresponding to the authentication information that no longer satisfies the authentication requirement.

9. The image processing apparatus according to claim 1, wherein
the controller is further configured to display a character for displaying the notification order of the user information in a different color, font, or size.

10. The image processing apparatus according to claim 1, wherein
the controller is further configured to:
assign a point according to the job type related to the image processing, and
display an aggregation result of the point.

11. The image processing apparatus according to claim 1, wherein
the controller is further configured to output a printed notification that urges to change the identified authentication information.

12. A control method performed by an image processing apparatus, the control method comprising:
storing authentication information;
controlling access by a user based on the authentication information; and
in a case that an authentication requirement is changed;
identifying authentication information that no longer satisfies the authentication requirement, and
displaying a ratio of pieces of the authentication information that no longer satisfy the authentication requirement to all pieces of the stored authentication information, and
determining a notification order of user information corresponding to the identified authentication information based on a job type related to image processing as a predetermined priority.

* * * * *